United States Patent [19]

Byers et al.

[11] Patent Number: 5,809,022

[45] Date of Patent: *Sep. 15, 1998

[54] METHOD AND APPARATUS FOR CONVERTING SYNCHRONOUS NARROWBAND SIGNALS INTO BROADBAND ASYNCHRONOUS TRANSFER MODE SIGNALS

[75] Inventors: Charles Calvin Byers, Aurora; James Philip Runyon, Wheaton, both of Ill.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 618,653

[22] Filed: Mar. 19, 1996

[51] Int. Cl.$^6$ .................................................. H04L 12/56
[52] U.S. Cl. ........................... 370/395; 370/474; 370/477
[58] Field of Search ........................... 370/356, 466–468, 370/477, 474, 420, 463, 395–399, 401, 411, 419, 389, 391, 392

[56] References Cited

U.S. PATENT DOCUMENTS

| | | | |
|---|---|---|---|
| 5,051,983 | 9/1991 | Kammerl | 370/474 |
| 5,287,348 | 2/1994 | Schmidt | 370/395 |
| 5,301,189 | 4/1994 | Schmidt | 370/356 |
| 5,345,445 | 9/1994 | Hiller | 370/397 |
| 5,521,915 | 5/1996 | Dieudonne | 370/395 |
| 5,581,551 | 12/1996 | Fundneider | 370/395 |

*Primary Examiner*—Douglas W. Olms
*Assistant Examiner*—Matthew C. Phillips
*Attorney, Agent, or Firm*—Dennis J. Williamson

[57] ABSTRACT

To provide a monolithic ATM transport the synchronous to asynchronous converter (SAC) of the invention converts the synchronous narrowband signals to composite cell ATM format. These cells can be combined with ATM video and data signals and can be delivered as an ensemble of ATM cells over either a standard SONET transport format or analog network to the customer premise. To convert the synchronous signals, the SAC provides format conversion needed to provide voice and other narrowband signals over ATM. The SAC also functions to agilely move between cell sizes such that the 48 bytes of the cell payload can be mapped to carry anywhere between the single and 48 connections. Thus, the SAC adjusts the cell configuration to balance performance and bandwidth use in a real-time manner.

20 Claims, 9 Drawing Sheets

| | | |
|---|---|---|
| CS1: | HEADER | 48 SAMPLES OF DS0 #1 |

| | | | |
|---|---|---|---|
| CS2: | HEADER | 24 SAMPLES OF DS0 #1 | 24 SAMPLES OF DS0 #2 |

| | | | | |
|---|---|---|---|---|
| CS3: | HEADER | 16 SAMPLES OF DS0 #1 | 16 SAMPLES OF DS0 #2 | 16 SAMPLES OF DS0 #3 |

| | | | | | |
|---|---|---|---|---|---|
| CS4: | HEADER | 12 SAMPLES OF DS0 #1 | 12 SAMPLES OF DS0 #2 | 12 SAMPLES OF DS0 #3 | 12 SAMPLES OF DS0 #4 |

| | | |
|---|---|---|
| CS6: | HEADER | 8 SAMPLES OF EACH OF 6 DSOs |
| CS8: | HEADER | 6 SAMPLES OF EACH OF 8 DSOs |
| CS12: | HEADER | 4 SAMPLES OF EACH OF 12 DSOs |
| CS16: | HEADER | 3 SAMPLES OF EACH OF 16 DSOs |
| CS24: | HEADER | 2 SAMPLES OF EACH OF 24 DSOs |
| CS48: | HEADER | 1 SAMPLES OF EACH OF 48 DSOs |

*FIG. 5*

METHOD AND APPARATUS FOR CONVERTING SYNCHRONOUS NARROWBAND SIGNALS INTO BROADBAND ASYNCHRONOUS TRANSFER MODE SIGNALS

CROSS REFERENCE TO RELATED APPLICATION

This application is related to the application of Charles C. Byers and James P. Runyon entitled "A Method And Apparatus For Converting Synchronous Narrowband Signals Into Broadband Asynchronous Transfer Mode Signals In An Integrated Telecommunications Network" Ser. No. 619,845 which application is assigned to the assignee of the present application, and is being filed concurrently herewith.

BACKGROUND OF THE INVENTION

The invention relates, generally, to telecommunications systems and, more particularly, to a method and apparatus for creating asynchronous transfer mode (ATM) cells.

Standard ATM technology packs data into cells where each cell is 53 bytes long and consists of a 5 byte header and a 48 byte payload. All of the bytes of the 48 byte payload are associated with a single connection. As a result, each cell must be delayed 6 microseconds prior to transmission to allow the 48 samples to be collected and inserted into the cell at an 8 kilobyte per second sampling rate. This delay results in an echo such that relatively expensive echo cancellers are used in the network (such as in the line cards of the switching system) to eliminate the effects of the delay.

An improvement over standard ATM technology is ATM composite cell technology. A detailed description of ATM composite cell technology can be found in U.S. Pat. No. 5,345,445 entitled "Establishing Telecommunications Cells In A Broadband Network" issued to Hiller et al. on Sep. 6, 1994. The basic difference between standard ATM technology and composite cell technology is that using composite cell technology, each cell carries one sample of up to 48 different connections where each sample fills one of the 48 bytes of the cell payload. ATM transmission systems using composite cell technology do not experience the delay found in standard ATM systems because the cell does not delay the 6 microseconds waiting for the 48 samples of the single connection to arrive. As a result, the problem of echo and the corresponding need for echo cancellers is eliminated.

Moreover, new connections usually can be established by using available bytes in the cells of existing virtual connections.

While composite cell technology is a very efficient mechanism for transmitting signals over ATM, it is somewhat limited in that the number of cells per frame is designed into the network. As a result, a significant increase or decrease in signal traffic cannot be easily accommodated. Moreover, while composite cell technology eliminates echo, it does not necessarily maximize the efficient use of bandwidth under all traffic loads. Thus, it would be desirable to provide a mechanism for adjusting the composite cell configuration to accommodate changes in signal traffic levels to appropriately balance the tradeoff between bandwidth and performance for any given traffic level.

Moreover, the typical network uses narrowband transports for narrowband signals such as digital voice, and broadband ATM transport, for broadband signals such as digital video and data, between the central office and outside distribution plant. The use of the two transports complicates the network as each element in the network between the central office and the customer premise must carry both transports. Importantly, the network operator must predict the relative volume of traffic that will be carried over the two transports and design and build the network facilities based on these predictions. If the predictions provide to be inaccurate, the amount of traffic that can be carried by the transports will be limited by the original network design such that the network may have excess capacity of one transport and insufficient capacity of the other transport. It is desirable to provide a network in which the type of information being carried is monolithic such that the network can adapt to and accommodate actual use loads rather than being constrained by expected use loads. In order to provide such a network a device for agilely converting the synchronous narrowband traffic to an ATM transport is required.

Thus, a problem in the art exists in that a method and apparatus for agilely converting from synchronous signals to ATM composite cell transport do not exist.

SUMMARY OF THE INVENTION

To convert synchronous signals to ATM signals and to agilely configure the cell, the synchronous to asynchronous converter (SAC) of the invention is provided. In the downstream direction, the SAC receives a plurality of 64 kbps synchronous time slots over a set of DS1 feeders or a synchronous SONET facility and converts them into a sequence of ATM composite cells, each cell holding up to 48 DS0s. Specifically, synchronous traffic enters the SAC through a facility interface. This could be a group of T1 signals or a SONET fiber. After the facilities are framed and converted to DS0s, a time slot interchanger (TSI) places feeder time slots from the facility interface into an ATM adaptation layer logic where the feeder time slots are converted to the composite cell stream destined for any distribution manager. A map in the TSI controls the interchanger function. Next, the DS0 channels from the TSI pass through an ATM Adaptation Layer (AAL) that buffers the time slots, gathers them into groups of up to 48, and adds a 5 byte ATM header containing addressing information that it reads out of a header RAM. The resulting cells are buffered, and sent to the backplane of the switching fabric. In the reverse direction, cells from the backplane are buffered in a cell queue, pass through the AAL where the headers are checked and stripped off, and finally, the recovered DS0s are passed through the TSI back to the facility interface. The SAC also functions to agilely move between cell sizes such that the 48 bytes of the cell can be mapped to carry anywhere between the single and 48 connections. Thus, the SAC adjusts the cell configuration to balance performance and bandwidth use in a real-time manner to make optional use of the distribution facility bandwidth.

BRIEF DESCRIPTION OF THE DRAWING

FIG. 5 is a table illustrating various cell configurations;

DETAILED DESCRIPTION

Figure 1A:
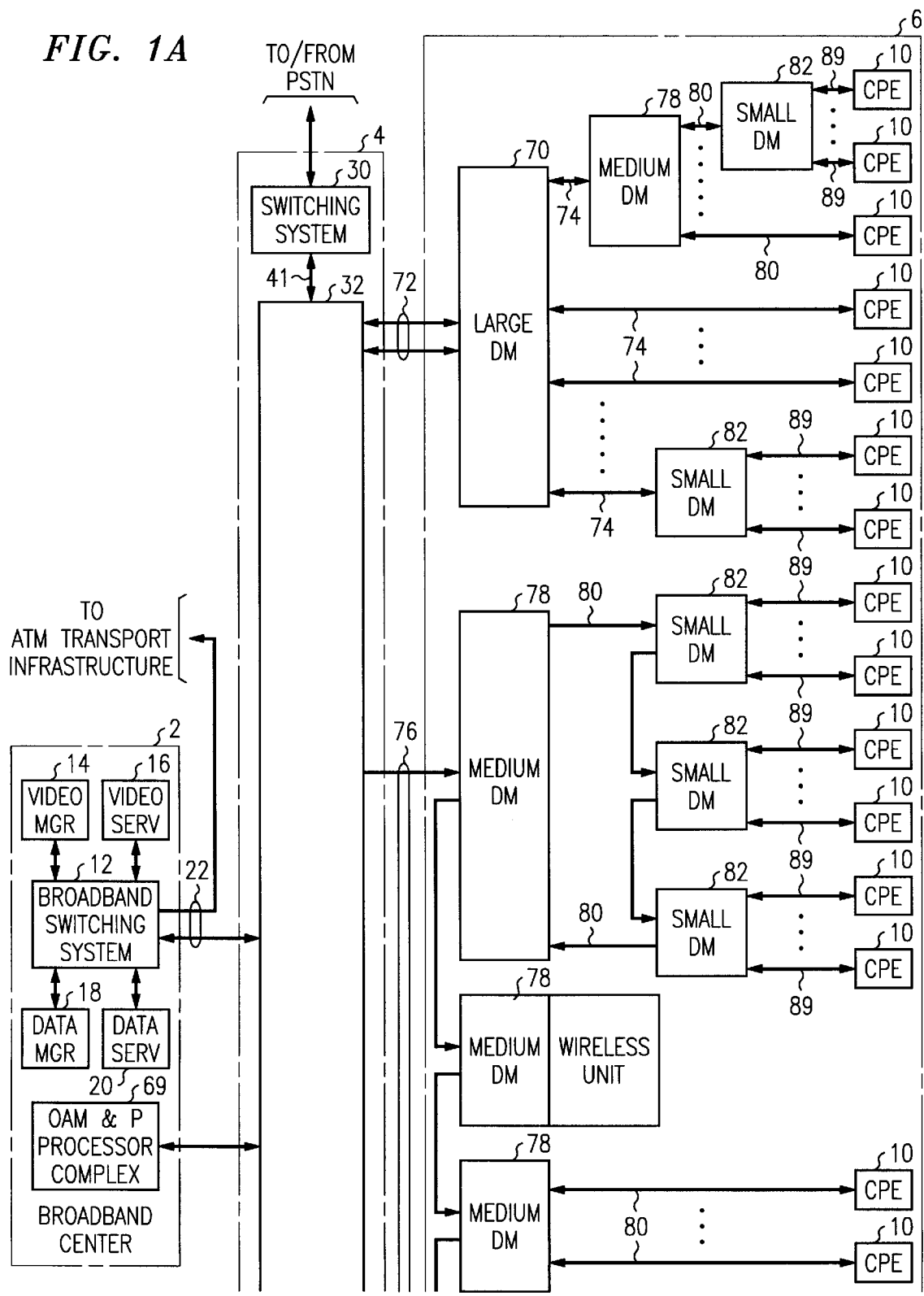
FIG. 1 is a block diagram showing the network architecture of the invention.
Figure 1B:
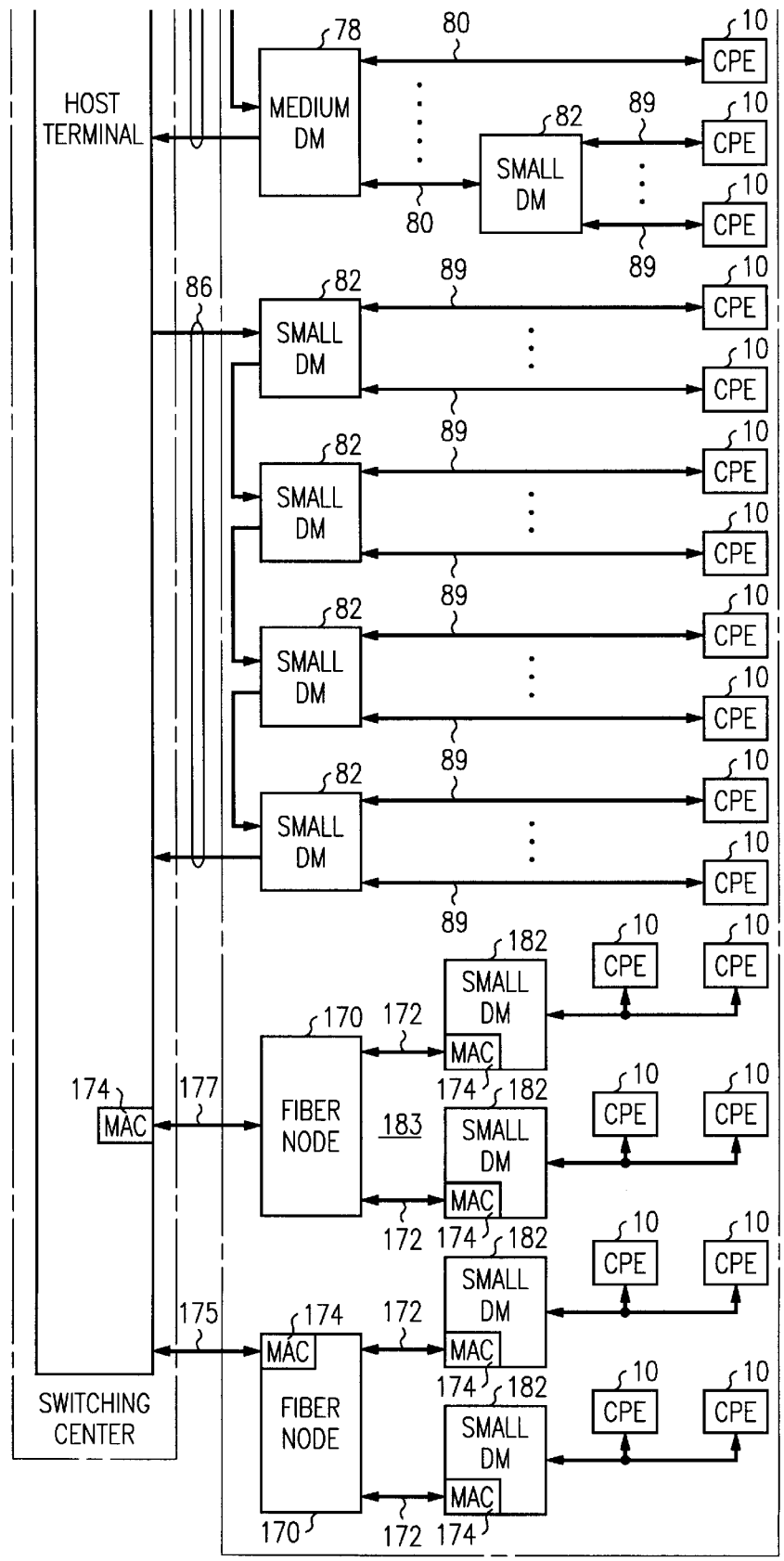
Figure 1C:
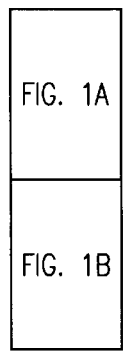

Referring more particularly to FIG. 1, the overall architecture of the network of the invention is shown consisting generally of a broadband center 2, a switching center 4 and an outside distribution plant 6. The broadband center 2 includes those elements that select, control and administer digital broadcast services and provides an interface between the video and data information providers and the network. The switching center 4 consists of those elements for switching telephony and digital video and data signals from the source of the signals (i.e. the broadband center 2 for video and data signals and the public switched telephone networks for the telephony signals) and for creating the ensemble of ATM cells. The outside distribution plant 6 includes those elements for transmitting the video, data and telephony signals to the customer premise equipment (CPE) 10. It is to be understood that the CPE 10 includes telephones, televisions, multimedia equipment, terminals, personal computers, home network controllers or any equipment used by a customer to receive and/or transmit video, data, telephony and control signals.

Referring more particularly to the broadband center 2, a broadband switching system (BSS) 12 supports both permanent virtual circuit and switched virtual circuit services. BSS 12 can consist of the GlobeView™- 2000 switch manufactured and sold by Lucent Technologies Inc. or other similar broadband switch. A video manager 14 acts as a subscriber interface to provide subscribers with access to video information providers to establish and manage network connections. The video manager 14 stores subscriber information and video provider information and serves as a central repository for this information. It provides this information to other network elements and to the information providers creating a revenue opportunity for the service provider. The video manager 14 also provides billing related measurements (such as session counts, usage information or the like), call set up, menus and call control.

A video server 16 provides the video content for transmission through the network to the customer premise equipment 10. The video server 16 can include switched digital video, broadcast digital video or the like. It will be appreciated that switched digital video signals are encapsulated in ATM cells and broadcast digital video includes compressed and encoded ATM formatted programming where an ensemble of channels are packaged and selectively broadcast to CPEs 10 in a serving area via BSS 12. Likewise, a data manager 18 and a data server 20 are provided for delivering the data content to the network in ATM format that function similarly to the video manager 14 and video server 16 described above. It will be appreciated that the BSS 12 can also provide connectivity to the Internet.

The content from the video servers 16 and data servers 20 is delivered to the network by BSS 12 as ATM-standard SONET rate (e.g. OC-3, OC-12 or OC-48) signals via optical links 22. The data stream from BSS 12 is delivered to the switching center 4 for distribution to the customer premise equipment as will hereinafter be described or to the ATM toll infrastructure including the Internet.

Figure 2:
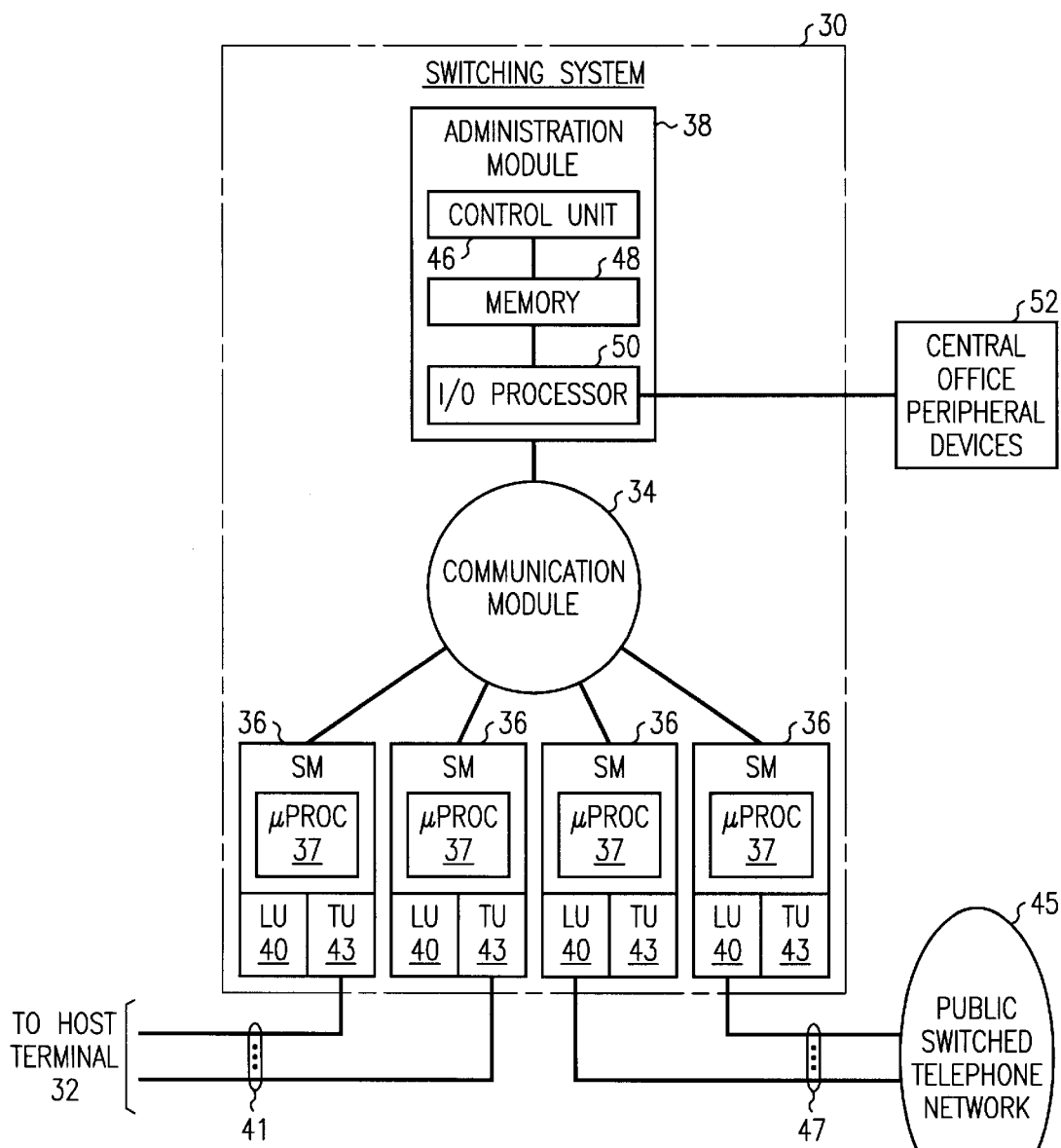
FIG. 2 is a block diagram of the switching system of the network of FIG. 1.

The switching center 4 consists of two major elements: a switching system 30 and a host terminal 32. Switching system 30 provides all narrowband telephony call processing and can consist of the 5ESS® switch manufactured and sold by Lucent Technologies Inc. and described in U.S. Pat. No. 4,592,048 issued to Beckner et al. on May 27, 1986 and in AT&T Technical Journal, Vol. 64, No. 6, Part 2, pp. 1305–1564, or other similar switching systems. Switching system 30 operates as is well known in the art to switch telephony signals through the network. The architecture of such a switching system is shown in greater detail in FIG. 2 and includes a communication module 34 forming a hub and having a plurality of switch modules 36, and an administration module 38 emanating therefrom. Each switch module 36 is controlled by microprocessor 37 and provides call processing, time division switching, and signaling for the lines and trunks to which it is connected. Line units 43 provide interface to digital signal carriers 41 that connect to the host terminal 32 and trunk units 40 provide interface to the trunks 47 that connect to other switches in the public switched network 45. The administration module 38 provides functions that can be centralized such as maintenance control, craft interface, text and data base management, call routing and time slot allocation. The administration module 38 consists of a control unit such as the Lucent Technologies Inc. 3B21D duplex processor 46 and main store memory 48. In some switching systems, the administration module is assisted by a separate processor that performs some administrative functions. The administration module 38 also includes an input/output processor 50 providing communication between the switching system 30 and peripheral devices 52 such as terminals, printers and the like. Communication module 34 is the hub of the switching system and allows communication between the administration module 28 and the switch modules 36. Communication module 34 consists of a message switch that provides the administration module-to-switch module, and switch module-to-switch module, message communication and a time multiplexed switch providing the switch module to switch module and switch module to administration module time slot connection for voice and data communication and the clock distribution.

Switching system 30 interfaces with host terminal 32 over a standard interface such as TR-303, TR-08 or the like. The interface is physically provided by standard synchronous time division multiplexing digital signal carriers 41 such as DS1, SONET OC-3, E1 or the like. In the preferred embodiment, between two and twenty-eight DS1s are used where no concentration is provided in the switching system. It will be appreciated that a greater number of DS1s may be used if desired.

Figure 3:
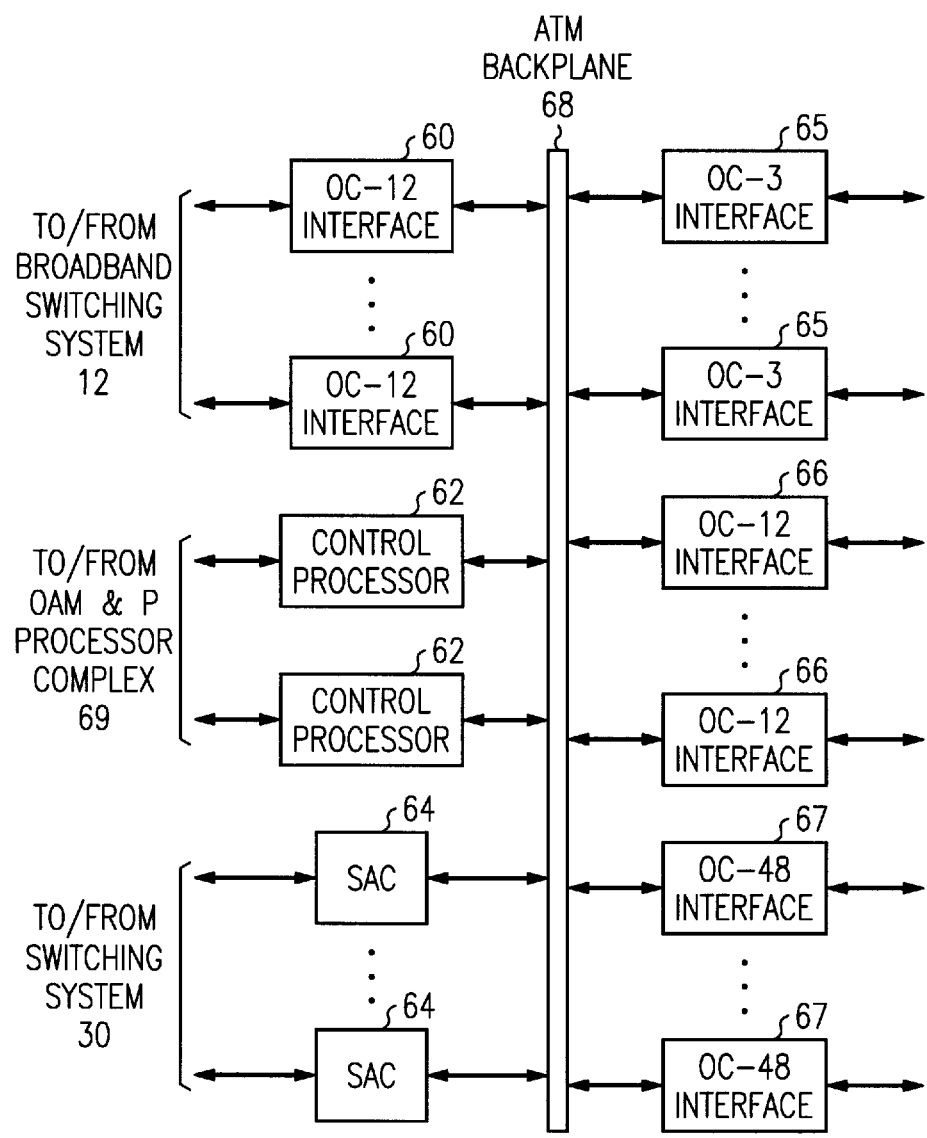
FIG. 3 is a block diagram of the host terminal of the network of FIG. 1.

Host terminal 32 serves as the integration point for all of the narrowband telephony and broadband digital signals destined for the CPEs. Host terminal 32, shown generally in FIG. 3, is a bus oriented switch having a plurality of ATM receivers, including OC-12 interfaces 60, control processors 62 and synchronous/asynchronous converters (SAC) 64 and a plurality of ATM transmitters, including OC-3 interfaces 65, OC-12 interfaces 66 and OC-48 interfaces 67. It should be noted that host terminal 32 could be configured as a shared memory or star topology if desired. Each ATM receiver drives cells onto ATM backplane 68 at predetermined time slots. All ATM cell transmitters monitor the addresses of all of the cells delivered from all of the receivers onto backplane 68, and if a particular cell's address matches an address stored in a transmitter's address table, that cell is captured from the backplane and is stored in a queue for that transmitter. The transmitters read the cells and send them to associated SONET facilities for delivery to the distribution managers. The switch fabrics are capable of broadcast and multicast. Alternatively, broadband interfaces or telephony interfaces, such as described with reference to FIG. 7, could be connected directly to ATM backplane 68.

The OC-12 interfaces 60 receive the OC-12 ATM signal from the broadband switching system 12 of the broadband center 2. The OC-12 interfaces 60 receive both the digital video signals and the data signals. The interfaces 60, as are known in the art, provide bus interfacing to prepare the signals for transmission over the network; provide signaling functions as designated by the chosen ATM adaptation layer; and provide the physical input/output interface between the network and the host terminal. Control processors 62 receive the operations, administration, maintenance and provisioning (OAM&P) signals from the OAM&P processor complex 69 shown as part of the broadband center 2 in FIG. 1. The control processors 62 communicate with the CPE, distribution managers, ATM infrastructure and the OAM&P processor complex 69 to set up routes through the ATM switch fabric. The control processors 62 also perform fault recovery and configuration management functions.

The synchronous to asynchronous converter (SAC) 64 converts the synchronous voice signals received from the switching system 30 into ATM signals. The SAC also creates the composite cells and controls the configuration of the cells to maximize the throughput of the system. The SACs 64 of the host terminal 12, as well as similar SACs in the distribution managers, allow the network of the invention to carry only ATM cells from the host terminal 32.

Figure 4:
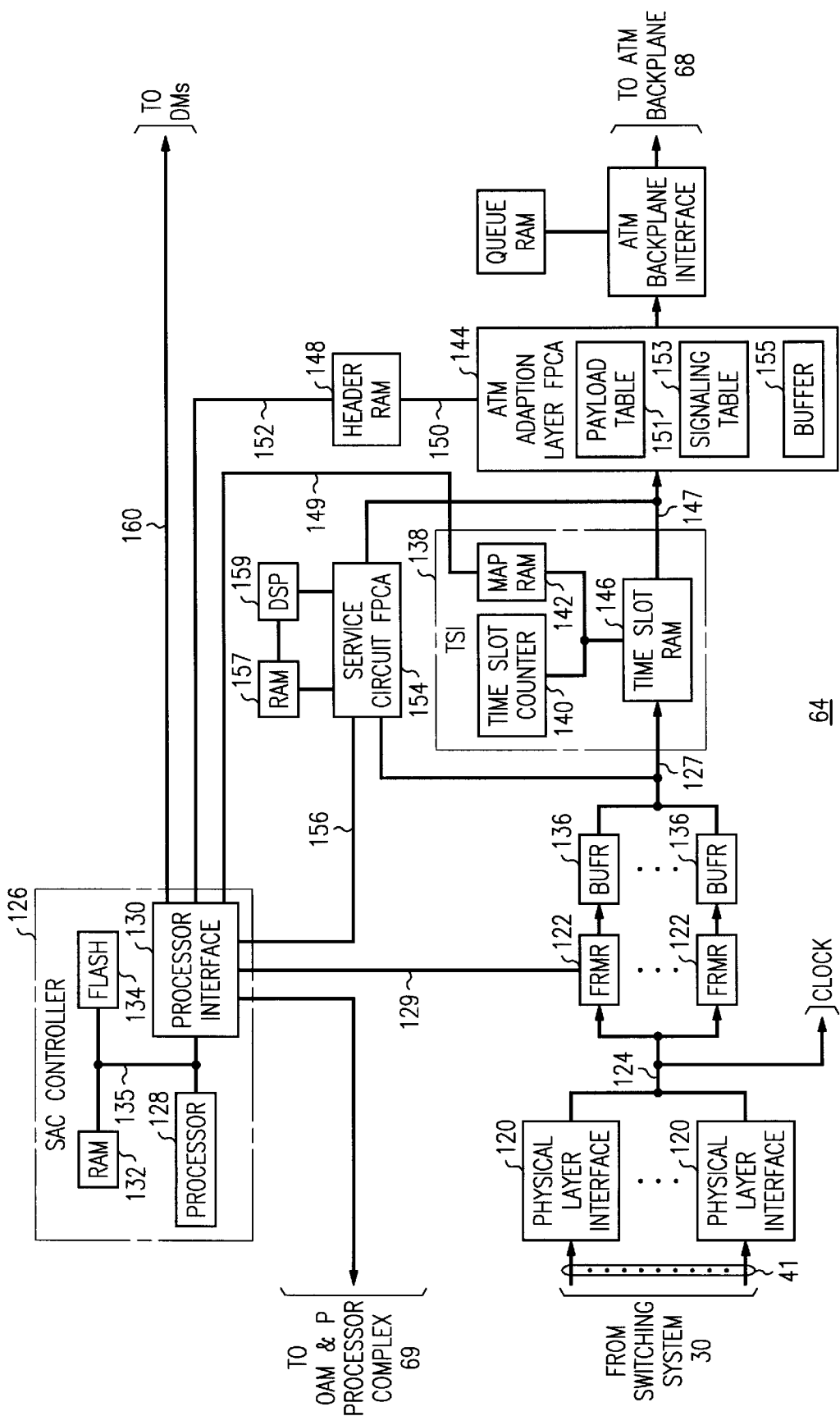
FIG. 4 is a block diagram of the Synchronous to Asynchronous converter of the network of FIG. 1.

Referring more particularly to FIG. 4, the SAC 64 is illustrated and includes a SAC controller 126 including a processor 128 such as a Motorola Power PC or 68000 derivative that communicates with other elements of the SAC and the system processor complex 69 via processor interface 130. SAC controller 126 further includes a RAM 132 and flash memory 134 that communicate with processor 128 and interface 130 over data link 135. Controller 126 is responsible for feeding framing information to framers 122, fault recovery, populating the time slot interchanger map RAM and performing the method for determining the composite cell configuration as will be hereinafter described. The SAC 64 includes a plurality of physical layer interfaces 120 that receive the synchronous signals from the host terminal 32 via interface 41. The physical layer interfaces 120 provides line protection as is known in the art. From the physical layer interfaces 120, the synchronous signals are delivered to framers 122 over bus 124. The framers 122 frame the signals relative to the system clock as directed by the SAC controller 126 via data link 129. The framers can consist of the AT&T 1000 BS T1 framer or any other suitable device. The framed signals from framers 122 are delivered to buffers 136.

From buffers 136, the framed signal is delivered over bus 127 to time slot interchanger (TSI) 138 that consists of a time slot counter 140, map RAM 142 and time slot RAM 146. The time slots arriving on bus 127 are ordered as directed by the map RAM 142 and delivered to bus 147. The map RAM 142 is updated by SAC controller 126 via data link 149 in accordance with the method of the invention for determining the composite cell configuration, as will hereinafter be described.

A service circuit field programmable gate array (FPGA) or application specific interpreted circuit (ASIC) 154 including RAM 157 and the service circuit digital signal processor (DSP) 159 monitors signaling state transitions on buses 127 and 147. In the downstream direction the service circuit 154 monitors requests for connections and disconnections from the switching system and in the upstream direction the service circuit detects off-hook and on-hook signals from the distribution managers as well as performing other standard DSP functions. The service circuit 154 informs the SAC controller 126 of these requests for connections and disconnections via data link 156 and this information is used in determining the composite cell configuration as will hereinafter be described. The service circuit 154 could also perform testing such as measuring noise levels and return loss, continuity checks, and drop tests and generates tones in both directions for testing purposes. The service circuit 154 also provides D-channel packing for ISDN signaling. Finally, the service circuit performs high level data link control (HDLC) that is a robust transmission protocol required for TR08 transmission.

The ordered synchronous signal from time slot interchanger 138 is delivered to the ATM adaptation layer (AAL) FPGA 144 over bus 147. The AAL 144 is the point in the SAC where the synchronous signals are converted into ATM cells. The AAL 144 communicates with header RAM 148 over data link 150 and with SAC controller 126 over data link 152 as will hereinafter be described. Further, the AAL 144 includes a payload table 151 that contains the configuration of the ATM cell payload. Further, the AAL includes a buffer 155 for buffering the incoming synchronous samples while the composite cells are being constructed.

Referring more particularly to the table of FIG. 5 and the flow chart of FIG. 6, the methodology for agilely changing the composite cell configuration based on actual traffic levels will be explained. Referring to FIG. 5, a number of composite cells are illustrated, all of which include an 8 byte header and 48 bytes of payload, however, the cells differ in the way that the 48 byte payload is configured. For example, cell size 1 (CS 1) consists of 48 samples of a single connection, i.e all 48 bytes of payload are samples from the same connection (standard ATM cell configuration). CS2 consists of a payload having 24 samples from two different connections. The other illustrated cell configurations CS3 through CS48 show different ratios of samples to connections where 100% utilization of the ATM cell payload occurs. The ratio between the number of samples and the number of connections can be varied provided that the product of these variables is 48. Moreover, it is possible to select the number of connections to be other than those shown in FIG. 5 where less than all of the available payload is utilized. For explanatory purposes, the number of samples per connection will be referred to as J and the number of connections per cell will be referred to as K where J×K=48. For example, for a CS 8 cell J=6 and K=8. The actual cell configuration will be determined by the SAC on a continuing basis as determined by traffic levels as will hereinafter be explained.

Figure 6A:
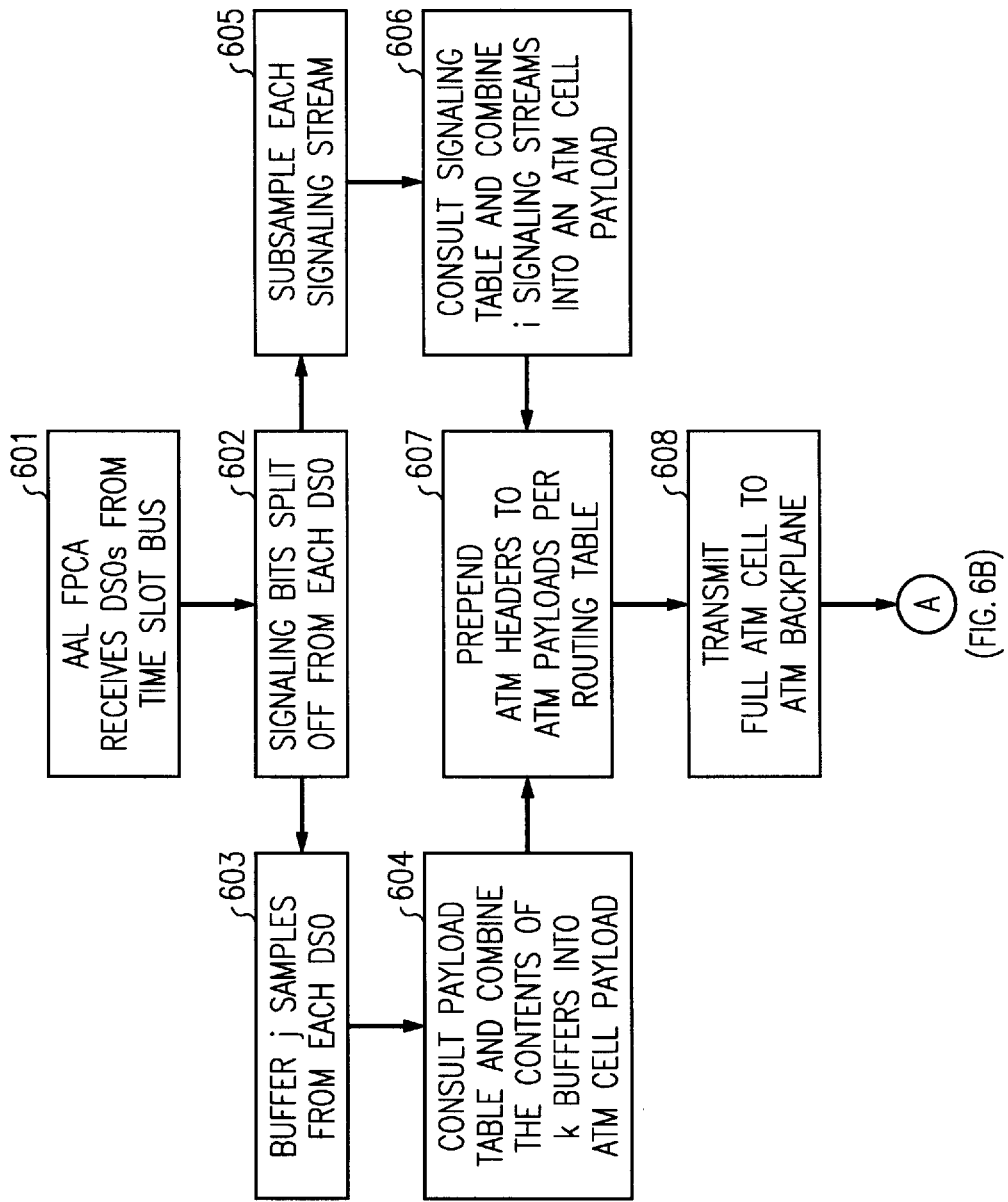
FIG. 6 is a flow chart illustrating the operation of the synchronous to asynchronous converter of the invention.
Figure 6B:
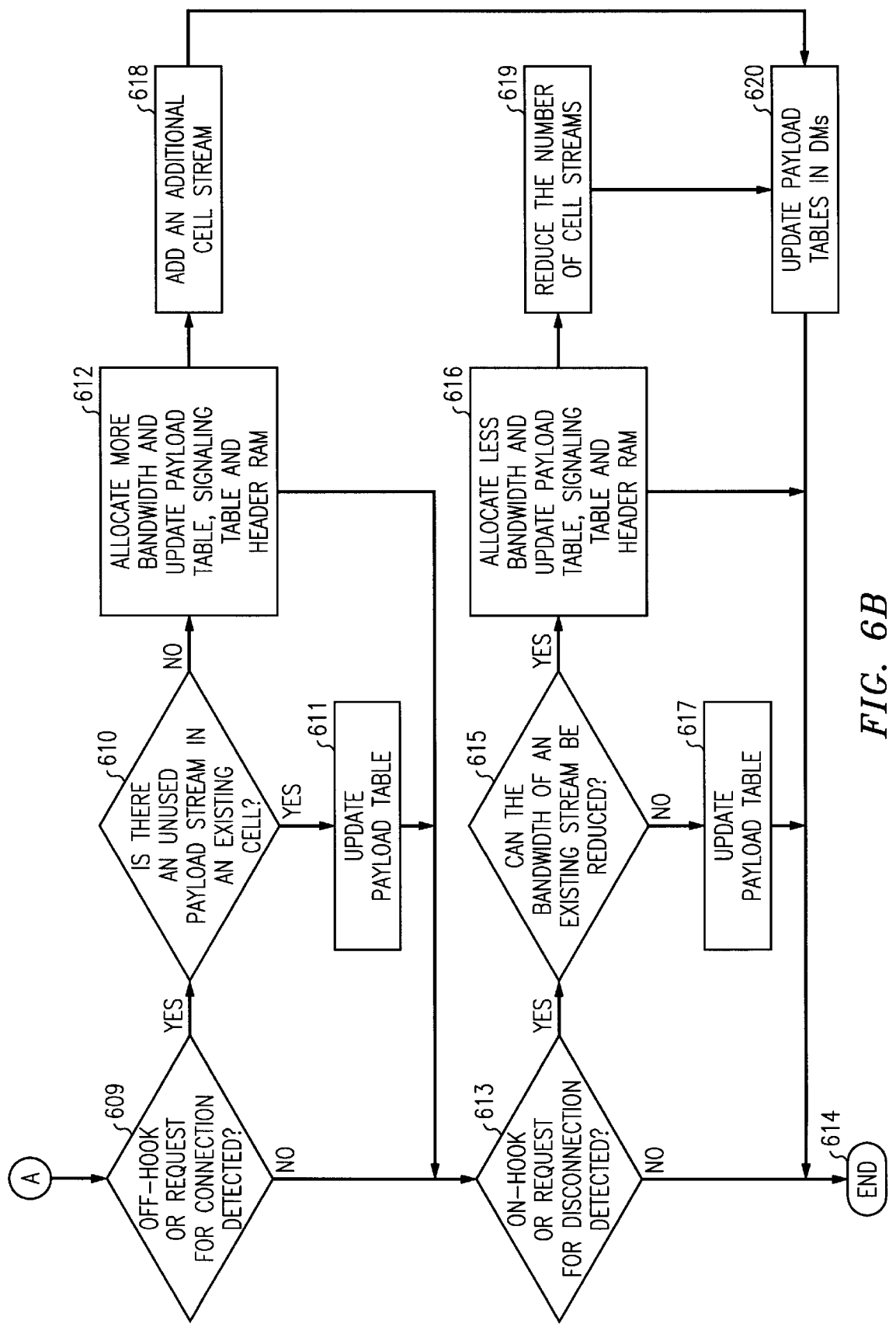

Referring to FIG. 6, assume for purposes of explanation that framed, synchronous, ordered signals are being delivered to AAL 144 over bus 147 and that the ATM payload is being configured as a CS6 cell. The AAL 144 receives DS0 s from time slot bus 147 every 125 microseconds (block 601). The signaling bits are split off from each DS0 either by the AAL 144 or by the service circuit FPGA 154 (block 602). J samples from each DS0 are buffered in the AAL 144 (block 603). Based on the assumption that a CS6 cell is being configured, J=8. A payload table 151 in the AAL 144 (see FIG. 4) is consulted and the contents of K buffers (where K is the number of connections per cell) are combined into a full ATM cell payload as ordered by the payload table (block 604). Again it is assumed that a CS6 cell is being configured where K=8. Simultaneously with the creation of the cell payload, the signaling bits stripped off from each DS0 are subsampled (block 605). A signaling table 153 (FIG. 4) in the AAL is consulted and the i signaling streams are combined into a full ATM cell payload, where i is the number of signaling streams carried in a signaling cell (block 606). ATM headers are then read from header RAM and are prepended to the full ATM cell payloads (block 607). The ATM cell is then transmitted via the ATM backplane interface to one of a plurality of backplane buses (block 608). The ATM backplane interface also formats the signaling for the specific backplane protocol and performs queuing and congestion control functions.

In addition to generating signaling composite cell streams that are carried in parallel with the payload composite cell streams, two alternative signaling transport streams could be employed. First, the signaling bits associated with a composite cell's worth of narrowband connections could be concatenated with the narrowband data in the same cell. This reduces the number of payload channels a given composite cell stream can carry by a factor corresponding to the ratio of payload bandwidth to signaling bandwidth. Second, the signaling streams could be carried out of band, by generating a complete ATM cell each time any line has a signaling state transition. The payload of this cell includes information about the identity of the line that had the transition and its old and new signaling state. This method uses bandwidth efficiently, at the cost of potentially requiring extra processing resources to handle the signaling messages, especially during situations where many lines have signaling transitions simultaneously.

To match the cell configurations to the actual traffic level, the SAC processor performs the method steps 609 through 618 shown in FIG. 6 each time a cell is transmitted onto the backplane. The SAC controller 126 first determines if a new off-hook state or request for a connection is detected by monitoring the signaling streams from the customer premise equipment and the host switching system (block 609). Specifically, the service circuit 154 detects changes in signaling states to determine if a CPE has gone off-hook or if a request for a connection from the switching system has been made as previously described. The service circuit communicates any state changes to the SAC controller over data link 156. If a state change has been detected, the AAL determines if there is an idle or unused payload stream in an existing cell that is being routed to the customer premise equipment destination with the new bandwidth request (block 610). Specifically, the SAC controller determines from the payload table in the AAL if the actual number of connections is less than K for a given cell. If there is an available connection (i.e. the number of connections<K) then the new connection is carried on the available connection and the payload table in the AAL is updated (block 611). If there is no available connection (i.e. the number of connections=K) then more bandwidth is allocated by revising the payload table, signaling table and header RAM to change the number of connections per cell (K) and the corresponding number of samples per connection (J) (block 612). In the example given above assume that the CS6 cell was carrying 6 connections such that the entire cell was full. To carry a new connection the SAC controller directs the AAL to reconfigure the cell to a CS8 cell having 8 available connections. The six original connections and the new seventh connection can then be accommodated with one idle connection remaining available. To make the conversion, the SAC controller maintains mappings for time slots for any of the possible cell sizes that may be used. When a change in the cell size is required, the mappings for the new cell size are delivered from the SAC controller to the AAL and header RAM such that the incoming signals can be mapped accordingly. Because the change in cell configuration, if necessary, occurs immediately after a cell is transmitted, the new mappings are delivered before the buffering and cell configuring steps (blocks 603 and 604) are performed, so the host and remote terminal AAL functions remain in sync.

Similarly, the SAC controller 126 performs the same analysis for the condition where a connection is terminated. Specifically, the service circuit FPGA detects signaling representing on-hook state changes or requests for disconnections (block 613). If no connection is terminated, the analysis is complete (block 614). If a connection is terminated, the AAL determines if the bandwidth of the existing stream can be reduced (block 615). Specifically, the SAC controller reviews the payload table of the AAL and determines if the number of connections in use could be carried by a cell using less bandwidth. For example, assuming a CS8 cell is in use, if the number of connections falls to six or less, a CS6 cell could accommodate all of the connections. Thus, the J and K values are changed in the routing tables to allocate less bandwidth to an existing stream (block 616). Using the same example, if seven connections remain in use, the CS6 cell could not accommodate all of the connections such that no cell configuration change is made and the payload table is simply updated to reflect the idled connection (block 617). If a request for an additional connection is received that exceeds the maximum payload capacity of the existing cell stream to an endpoint, an entirely new composite cell stream is created (block 618). Likewise, if the removal of a connection results in a situation where the existing connections can be accommodated without using an additional cell stream, the number of cell streams is reduced (block 619). If the cell configuration is changed to either increase or decrease the bandwidth of the existing stream (blocks 604 and 608), or to increase or decrease the number of cell streams (blocks 618 and 619) a control message is sent to the distribution managers to update the payload table in the distribution manager SAC over control bus 160 (block 620). While the SAC has been described with particular reference to the integrated network of the invention, it will be appreciated that the SAC has separate utility and can be used in any system where conversion between synchronous signals and ATM is desired or where being able to agilely move between various cell size configurations is desired.

Referring to FIG. 1, the composite cell ATM signal including telephony, video and data is delivered from the host terminal 12 to the distribution managers (DMs) in outside distribution plant 6. The size of each of the distribution managers and of the ATM transport connections from the host terminal 12 to the distribution managers is dictated by the number of lines to be hosted by the distribution manager and the traffic mix. An OC-48 link 72 connects the host terminal 12 to a large distribution manager 70 in a point-to-point connection that hosts between approximately 64 and 2K lines 74. An OC-12 link 76 connects the host terminal 12 to medium distribution managers 78 arranged in a SONET ring connection where the signals are delivered from the upstream distribution manager to the adjacent downstream distribution manager. Each medium distribution manager 78 hosts between approximately 16 and 64 lines 80 and up to approximately 8 distribution managers per OC-12 ring. Finally, small distribution managers 82 capable of hosting from approximately 1 to 16 lines 89 are connected to the host terminal 12 over OC-3 links 86. Approximately 16 small distribution managers arranged in a SONET ring configuration can be supported. Note, the distribution managers can also be arranged in a hierarchical configuration where a large distribution manager 70 hosts one or more medium distribution managers 78 or small distribution managers 82 or where a medium distribution manager hosts one or more small distribution managers as illustrated in FIG. 1. Moreover, as shown in FIG. 1 a larger distribution manager can host a ring of smaller distribution managers, if desired. The actual maximum capacity of a distribution link depends upon traffic statistics, fault tolerance considerations and margin for growth.

Figure 7:
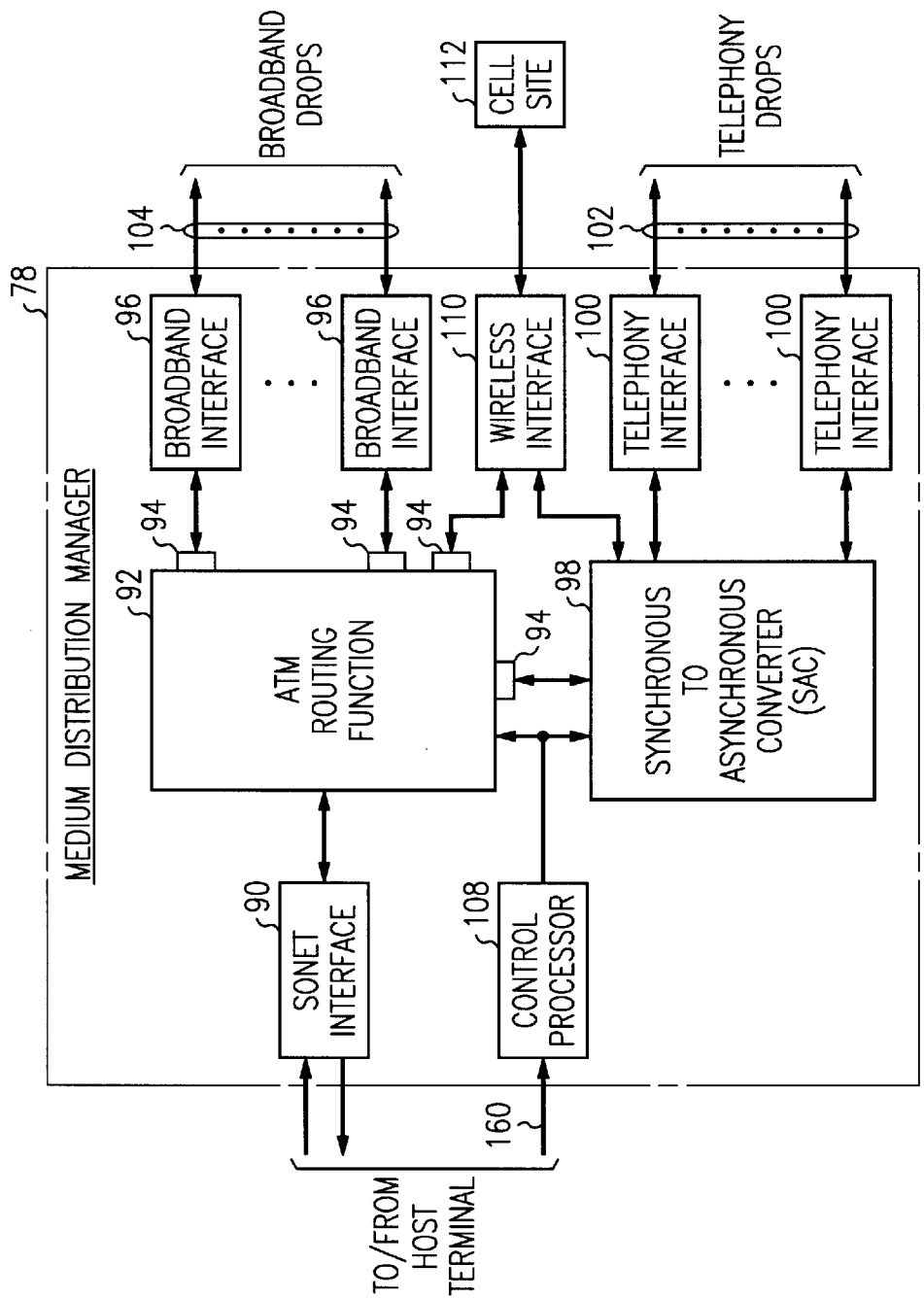
FIG. 7 is a block diagram of the distribution manager of the network of FIG. 1.

Referring more particularly to FIG. 7, a medium distribution manager 78 is illustrated consisting of a SONET interface 90 for providing the physical interface between the OC-12 link 76 and the ATM switch fabric or router. The ATM signals are delivered from the SONET interface 90 to ATM switch fabric 92 where the cells are distributed to the appropriate destination. Specifically, the ATM switch fabric 92 routes the cells to one of several ports 94 based on the content of the cell headers as is known in the art. Selected ones of the ports 94 are connected to broadband interfaces or line cards 96 for routing data and video cells to the appropriate broadband drops 104 connected to CPEs 10. Narrowband composite cells, as indicated by the header address, are routed to a SAC 98 disposed between the ATM switch fabric and the telephony interfaces or line cards 100. The SAC 98 is constructed and operates in the same manner as SAC 64 of the host terminal 32 to convert the ATM cells to synchronous signals in the downstream direction and to convert synchronous signals to ATM cell in the upstream direction except that the SAC 98 does not make independent decisions regarding cell configuration, rather it reacts to the decisions made by SAC 64. The synchronous voice signals are delivered to telephony interfaces 100 that are connected to the telephony line drops 102. If the network of the invention is to support wireless or personal communication services (PCS), the data or video cells and telephony cells are delivered to a wireless interface 110 that transmits the signals to RF transceivers, antennas and control logic at cell site 112. A control processor 108 controls the ATM cell routing, bandwidth management functions, signaling functions and test functions as known in the art. The large distribution managers and small distribution managers have a similar construction except that the number and bandwidth of facilities are increased or decreased to increase and decrease the capacity of the devices, respectively, and the small distribution manager may not require facility redundancy.

Referring to FIG. 1B, as shown generally at 183 it is further contemplated that the ATM voice, video and data from host terminal 32 be delivered through an analog outside distribution plant 177 (such as a typical hybrid fibercoaxial (HFC) tree and branch configuration) to fiber node 170 and then to a small distribution manager 182 located at or near the customer premise via a coaxial link 172. The distribution manager 182 is similar to the distribution manager described with reference to FIG. 7 except that the SONET interface 90 is replaced by an RF receiver and an IEEE 802.14 medium access protocol (MAC) 174. In this scenario, ATM composite cells for narrowband signals are assembled/disassembled at the MAC 174 located in the host terminal 32 and at the small DM 182. These ATM composite cells together with other ATM signals (video/data/signaling) are converted to an analog ATM signals using the proposed IEEE 802.14 medium-access protocol (MAC) 174 at the host terminal and converted back to standard ATM cells by a MAC 174 located in the small distribution manager. Except for the analog distribution medium and protocol, the scenario would be identical as that defined above. It can be appreciated that a plurality of composite cells for narrowband services could be formed at the fiber node 170 for all subtending traffic or for each coaxial drop which supports a plurality of customers. It will also be appreciated that the composite cell could be supported on a per customer basis. Finally, it is also envisioned that a SONET link 175 could carry digital ATM traffic to the fiber node 170. In this configuration, the composite cell would be assembled/disassembled at the fiber node by MAC 174 rather than at the host terminal.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. An apparatus for generating asynchronous transfer mode (ATM) cells comprising:

means for receiving and synchronous time slots over a plurality of signal carriers from a number of connections;

means for framing said synchronous time slots relative to a system clock;

means for ordering said synchronous time slots;

means for creating ATM cells from said ordered synchronous time slots, including means for mapping the synchronous time slots into an ATM cell payload, said payload consisting of a plurality of bytes and applying an ATM header to each payload, said means for mapping being responsive to the number of connections where the number of bytes per connection is variable; further comprising:

means responsive to the detection of an additional call, testing whether a channel is available in an ATM cell payload of an existing ATM virtual circuit having an ATM destination common to an ATM destination for said additional call, and means responsive to a result of said testing, indicating no channel available, for increasing a number of channels carried by one of said existing ATM virtual circuits to accommodate the additional call.

2. The apparatus of claim 1, wherein the means for mapping the synchronous time slots includes a payload table for defining the cell configuration and means for changing the contents of the payload table.

3. The apparatus of claim 2, wherein the means for changing the contents of the payload table includes means for determining the number of required connections.

4. The apparatus of claim 3, wherein the means for determining the number of required connections includes means for determining requests for connections and disconnections.

5. The apparatus of claim 2, further including a processor for changing the contents of the payload table.

6. A method of generating Asynchronous transfer mode (ATM) cells comprising the steps of:

receiving synchronous time slots over a plurality of signal carriers from a number of connections;

framing said synchronous time slots;

ordering said synchronous time slots;

creating ATM cells from said ordered synchronous time slots including means for mapping the synchronous time slots into an ATM cell payload having a plurality of bytes and applying an ATM header to each payload, said mapping being responsive to the number of required connections where each of the required connections uses a payload stream and where the number of bytes per connection is variable; further comprising the steps of:

responsive to the detection of an additional call, testing whether a channel is available in an ATM cell payload of an existing ATM virtual circuit having an ATM destination common to an ATM destination for said additional call: and if a result of said testing indicates no channel available, increasing a number of channels carried by one of said existing ATM virtual circuits to accommodate the additional call.

7. The method of claim 6, further including the step of buffering j samples from said signal carriers where j is the number of samples per connection in one of said ATM cells.

8. The method of claim 6, further including the step of combining the contents of k buffers in said ATM cell payload where k is the number of connections in one of said ATM cells in response to said means for mapping.

9. The method of claim 8, further including the step of transmitting said ATM cells to an ATM backplane.

10. The method of claim 6, further including the step of detecting requests for connections and in response to the detection of a request for connection, determining if there is an unused payload stream in an existing ATM cell.

11. The method of claim 10, further including the step of updating the means for mapping in response to the step of determining if there is an unused payload stream.

12. The method of claim 10, further including the step of allocating more bandwidth if said step of determining if there is an unused payload stream determines that there is no unused payload stream.

13. The method of claim 6, further including the step of detecting requests for disconnections and in response to the detection of a request for disconnection, determining if the bandwidth of an existing stream can be reduced.

14. The method of claim 13, further including the step of allocating less bandwidth in response to the step of determining if the bandwidth of an existing stream can be reduced.

15. The method of claim 6, further including the step of determining if the number of payload streams should be increased or decreased.

16. An apparatus for generating asynchronous transfer mode (ATM) cells comprising:

an interface receiving synchronous time slots over a plurality of transmission numbers;

at least one framer for framing said synchronous time slots relative to a system clock;

a time slot interchanger ordering said synchronous time slots;

an ATM adaption layer for creating ATM cells from said ordered synchronous time slots including means for mapping the synchronous time slots into an ATM cell payload and applying an ATM header to each payload, said means for mapping being responsive to the number of required connections where the number of bytes per connection is variable; further comprising:

means responsive to the detection of an additional call, testing whether a channel is available in an ATM cell payload of an existing ATM virtual circuit having an ATM destination common to an ATM destination for said additional call; and means responsive to a result of said testing, indicating no channel available, for increasing a number of channels carried by one of said existing ATM virtual circuits to accommodate the additional call.

17. The apparatus of claim 16, wherein the means for mapping the synchronous time slots includes a payload table for defining the cell configuration and means for changing the contents of the payload table.

18. The apparatus of claim 17, wherein the means for changing the contents of the payload table includes means for determining the number of required connections.

19. The apparatus of claim 18, wherein the means for determining the number of required connections includes means for determining requests for connections and disconnections.

20. The apparatus of claim 17, further including a processor for changing the contents of the payload table.

* * * * *